Patented Dec. 4, 1923.

1,475,976

UNITED STATES PATENT OFFICE.

JOSEPH WARNER, OF NASHVILLE, TENNESSEE.

PROCESS OF MAKING FERROPHOSPHORUS.

No Drawing.   Application filed July 16, 1923.  Serial No. 651,975.

*To all whom it may concern:*

Be it known that JOSEPH WARNER, citizen of the United States, residing at Nashville, in the county of Davidson and State of Tennessee, has invented certain new and useful Improvements in Processes of Making Ferrophosphorus, of which the following is a specification.

My invention relates to a process for making ferrophosphorus in the blast furnace. The present practice of producing ferrophosphorus in the blast furnace consists in feeding the charge into the top of the furnace. The usual charge comprises iron ore, phosphate rock, silica, sometimes lime, and coke. The reaction which takes place in the furnace results in a reduction of the iron from its ore, which combines with the reduced phosphorus from the phosphate rock to form ferrophosphorus. The silica and the calcium salts unite to form a calcium silicate slag. There are a number of disadvantages in a furnace method where all the materials of the charge are fed in at the top of the furnace. One of the objects of my invention is to eliminate these insufficiencies by feeding some of the charge into the furnace, principally the phosphate rock, through the tuyères of the furnace by means of an air blast.

On account of the practical inability to accurately control the proportions of the ingredients of the charge, the furnace will become foul from time to time. If there is an excess of lime salts in the charge, what is known as "high or built up bottom" will occur. An analogous situation will occur when the slag becomes too acid from excess of silica. In order to correct this condition, the proportions of the materials fed in at the top must be changed, but before these materials arrive at the smelting zone, a period of ten or twelve hours will pass.

Due to the slow descent of the materials through the furnace and to the fact that powdered calcium phosphate is very light, there is a considerable mechanical loss of phosphate rock in the fume. Loss of phosphorus due to volatilization in the form of oxide also occurs. The phosphate rock is introduced into the top of the furnace in lump form and the heating efficiency of the coke under these conditions is not as high as by my method.

I use preferably a high silica iron ore and charge it into the top of the furnace with the necessary fuel in the form of coke, charcoal or other fuel. The phosphate rock in the form of a powder is blown in through the tuyères by an air blast. The temperature at the tuyères is such that the same reactions will take place as have been above outlined.

The principal advantage of feeding the phosphate rock through the tuyères is that it is possible to immediately effect a change in the smelting zone, when once it has been determined that the furnace is not operating properly, by increasing or decreasing the quantity of such rock.

By feeding the phosphate rock through the tuyères, directly into the smelting zone, losses due to volatilization as well as mechanically carried over phosphate rock is practically eliminated.

By bringing the phosphate rock in a finely powdered condition directly into contact with the incandescent material in the smelting zone, a greater fuel efficiency is attained than when the phosphate rock is heated in a lump form. Although I have indicated phosphate rock as the principal ingredient of the charge to be introduced through the tuyères, it is within the scope of my invention to also blow in through the tuyères, other ingredients of the charge as conditions may demand. If the furnace slag should be too basic, silica in a powdered condition can be blown through the tuyères into the smelting zone. Powdered fuel, lime and powdered limestone may also be blown in, as well as iron ore and coke. Any phosphate bearing material may be used including apatite, nelsonite and phosphate of alumina.

I claim:

1. The process of producing ferrophosphorus in the blast furnace comprising charging fuel and iron ore in the top of the furnace and feeding phosphate bearing material through the tuyeres into the smelting zone.

2. The process of producing ferrophosphorus in the blast furnace comprising charging fuel and iron ore in the top of the furnace and blowing phosphate bearing material in a powdered condition through the tuyères in the smelting zone.

3. The process of producing ferrophosphorus in the blast furnace comprising charging fuel and iron ore in the top of the furnace, blowing phosphate bearing material in a powdered condition through the tuyères into the smelting zone and varying the quantity of the phosphate bearing material in accordance with the furnace operating conditions.

4. The process of producing ferro-phosphorus in the blast furnace comprising introducing a portion of the charge at the top of the furnace and feeding in the remainder of the charge, containing phosphate bearing material, through the tuyères.

In testimony whereof, I affix my signature.

JOSEPH WARNER.